Oct. 21, 1952  L. D. CARON, JR., ET AL  2,614,786
WEIGHING AND PACKAGING MACHINE
Filed Sept. 3, 1948  4 Sheets-Sheet 1
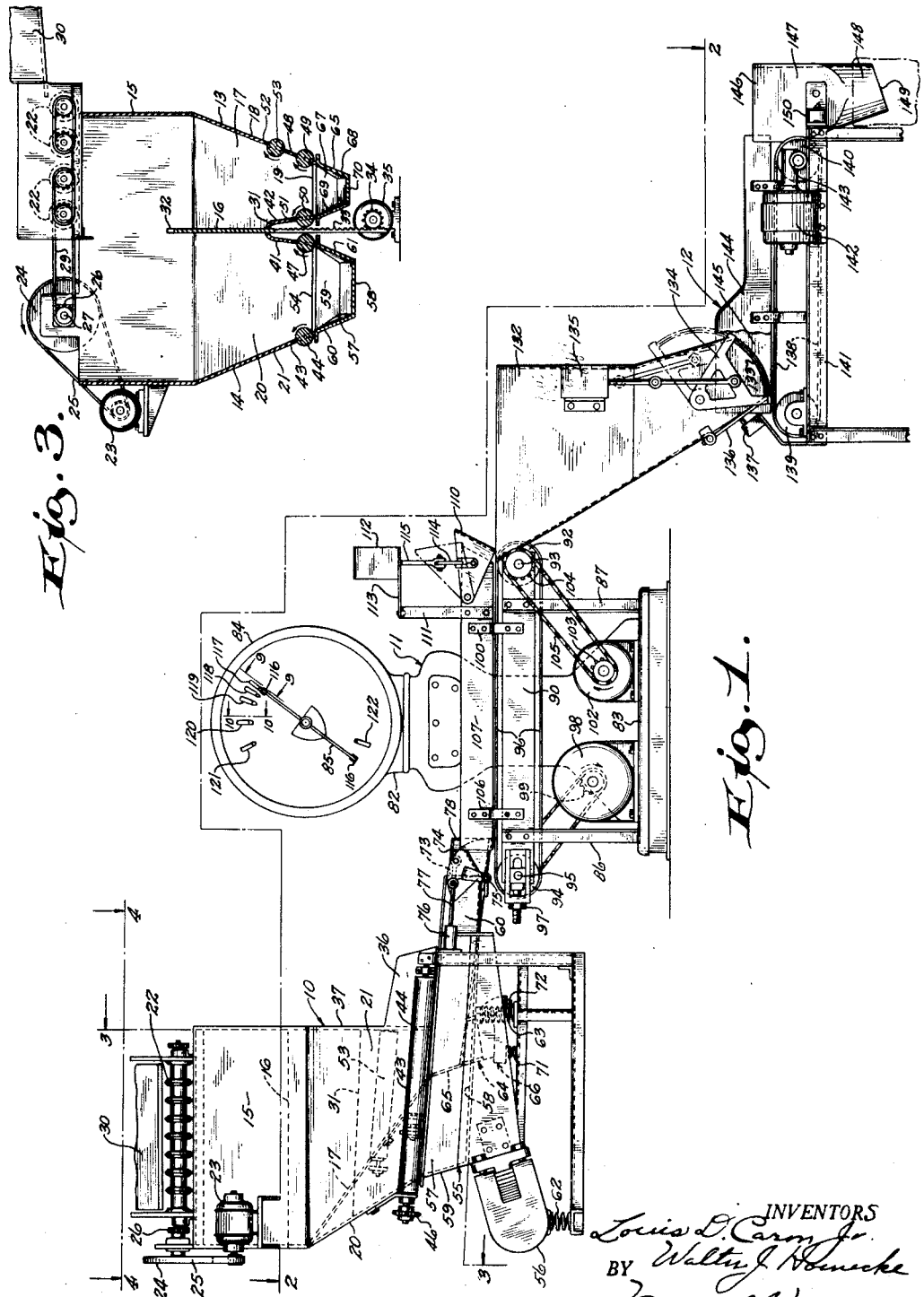
INVENTORS
Louis D. Caron Jr.
Walter J. Hornecke
BY
Morrell & Morrell
ATTORNEYS.

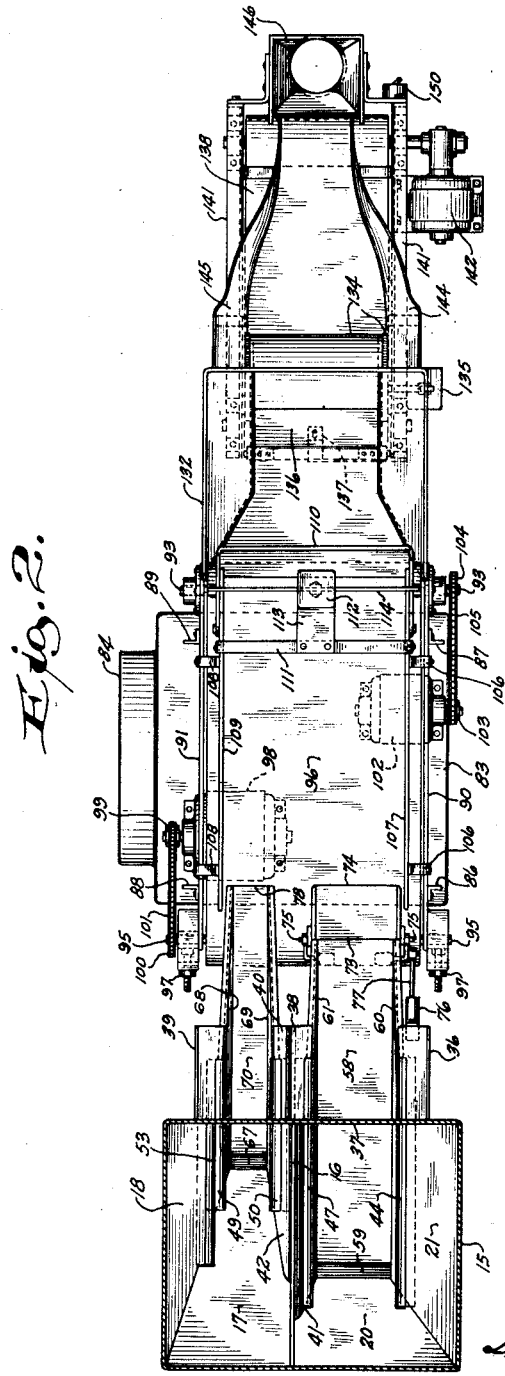

Oct. 21, 1952 L. D. CARON, JR., ET AL 2,614,786
WEIGHING AND PACKAGING MACHINE
Filed Sept. 3, 1948 4 Sheets-Sheet 3
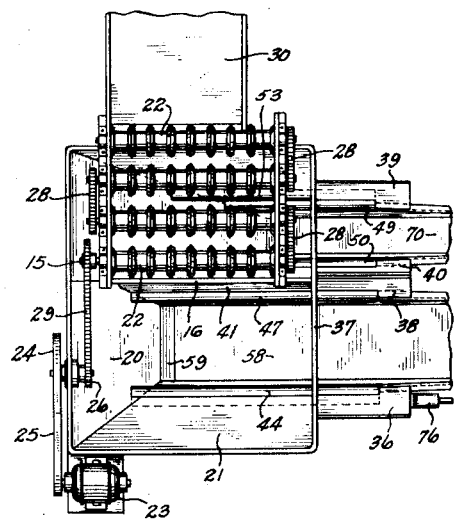
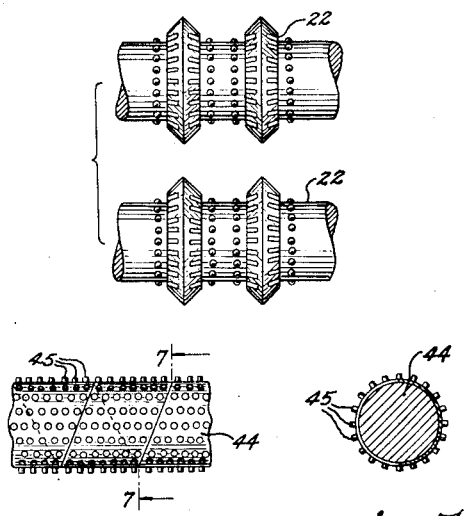
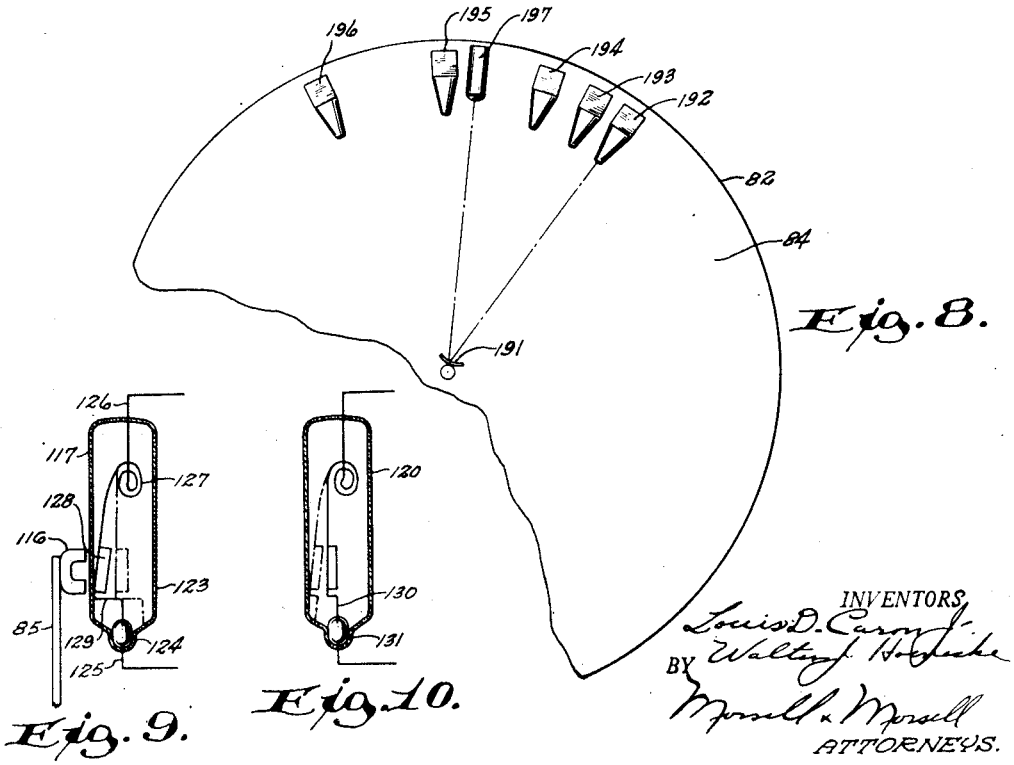

Oct. 21, 1952    L. D. CARON, JR., ET AL    2,614,786
WEIGHING AND PACKAGING MACHINE

Filed Sept. 3, 1948      4 Sheets-Sheet 4

INVENTORS
Louis D. Caron Jr.
Walter J. Hoenicke
BY
Morrell & Morrell
ATTORNEYS.

Patented Oct. 21, 1952

2,614,786

UNITED STATES PATENT OFFICE 2,614,786

WEIGHING AND PACKAGING MACHINE

Louis D. Caron, Jr., and Walter J. Hoenecke, Milwaukee, Wis., assignors to Terminal Packaging Company, Milwaukee, Wis., a corporation of Delaware Application September 3, 1948, Serial No. 47,664

10 Claims. (Cl. 249—2)

1

This invention relates to improvements in weighing and packaging machines, and more particularly to machines for weighing and packaging non-free-flowing materials.

It is a general object of the invention to provide a machine which is capable of receiving a steady stream of non-free-flowing material, such as potatoes or onions, at the intake end thereof, of metering out accurately weighed portions of said material, and of depositing said portions into packages at the delivery end thereof.

A further object of the invention is to provide a machine of the class described which is capable of performing the weighing and packaging operations substantially continuously and with high speed.

A further object of the invention is to provide a machine of the class described which meters out portions having a weight equal to or greater than a predetermined amount, while limiting the amount of overweight to a minimum.

A further, more specific object of the invention is to provide a machine of the class described which is adapted to separate the material according to the size of the units thereof into two groups—one group comprising relatively small units and the other group comprising relatively large units; the machine being further adapted to weigh out a substantial part of each portion to be packaged from either or both groups, and being arranged to complete the weighing operation by feeding small units only until the predetermined weight is obtained for the portion. Thus, the possible overweight for each portion is limited to something less than the weight of one of the small units so that only a relatively small margin of overweight is possible.

A further object of the invention is to provide a machine of the class described wherein a substantial part of the portion to be packaged is fed onto the scale rapidly, the feed to the scale being decelerated as the weight thereon approaches the predetermined amount, and said feed being stopped entirely when the predetermined weight is reached.

A further object of the invention is to provide a machine of the class described wherein the material is weighed on a continuously moving endless belt which is mounted on a scale platform. Thus, the material is prevented from piling up on the scale at the discharge ends of the feeding conveyors.

A further object of the invention is to provide a machine of the class described wherein the discharge end of those conveyors which feed the

2 endless belt for the scale platform are positioned sufficiently close to said belt so that material is discharged onto the belt with a rolling motion and with substantially no dropping of the material. Thus, there is immediate registration of the weight of the unit after it leaves the mouth of the conveyor, and the error which would otherwise be caused by the momentum of the dropping units is eliminated as is the overweight which would otherwise be caused by the addition, to the measured portion, of units in suspension which might be dropping from the mouth of an elevated conveyor at the same instant that the predetermined weight is reached by the portion of material on the weighing belt.

A further object of the invention is to provide a machine of the class described having two or more hoppers into which the different sized units of material are directed after they have been separated by sizing rolls, each of said hoppers having a pair of oppositely disposed inwardly sloping side walls and each of said hoppers opening into a separate vibratory conveyor which is adapted to feed said material onto the weighing belt, said hoppers also being provided, in each of said pair of oppositely disposed sloping side walls, with one or more rotating rubber rollers which agitate the material in said hoppers in a manner to prevent arching or jamming of the material.

A further object of the invention is to provide a machine of the class described wherein the rubber rolls in the hoppers thereof are disposed parallel to the vibratory conveyors thereof and wherein said rolls by their rotative action aline elongated units of the material with the longitudinal axis of the vibratory feeders. Thus, jamming which might be caused by very long potatoes, if they were not so alined, is prevented.

A further object of the invention is to provide a machine of the class described wherein the hoppers for the sized units are provided with a movable common wall or partition which may be lowered to allow communication between said hoppers, and thereby permit any excess of the smaller units to overflow into the hopper for the larger units.

A further object of the invention is to provide a machine of the class described having an endless belt mounted on a scale platform, said endless belt being adapted to be actuated by one or the other of a pair of motors, one of said motors being a slow speed motor which drives the belt during the weighing operation, and the other being a high speed motor which alternatively drives the belt to cause rapid discharge of the weighed portion of material therefrom.

A further object of the invention is to provide a machine of the class described wherein the motors for driving the weighing belt are mounted on the scale platform, thereby eliminating any error from torque or the like, whereby the only variable force acting on the scale platform is that caused by the weight of material on the weighing belt.

A further object of the invention is to provide a machine of the class described wherein the delivery end of at least one of the vibratory conveyors is provided with an electrically operated shut-off gate and wherein the operation of the hopper rolls, the vibratory conveyors, the shut-off gates, and the weighing belt motors are controlled by an electrical circuit which is responsive to the weight of the material on said weighing belt.

A further object of the invention is to provide a machine of the class described wherein the electrical circuit employed therein may be used either with mercury type magnetic switches or with photo-electric switches associated with the weighing scale to control the various steps in the operation thereof.

A further object of the invention is to provide a machine of the class described wherein the weighing belt is provided with an electrically operated shut-off gate at its discharge end and wherein said weighing belt discharges at high speed, as said gate is opened, into an intermediate hopper, said intermediate hopper being provided with interlocking means for preventing the opening of said shut-off gate as long as there are any units of material in said intermediate hopper.

A further object of the invention is to provide a machine of the class described wherein the intermediate hopper is provided with an electrically operated shut-off gate which, when open, permits discharge of material from said hopper onto a high speed delivery conveyor, said gate being provided with interlocking means which prevents the shut-off gate for the weighing belt from opening while the intermediate hopper gate is open.

A further object of the invention is to provide a machine of the class described wherein the high speed delivery conveyor thereof is provided with fixed skirts extending longitudinally and mounted adjacent the upper surface thereof, said skirts being spaced apart a distance substantially equal to the width of the delivery conveyor belt at the end which is adjacent the shut-off gate for the intermediate hopper, and said skirts converging to a relatively narrow throat which is directed into a packaging funnel at the opposite end. The said skirts are effective in alining elongated units of the material with the longitudinal axis of the delivery conveyor to prevent jamming of the material and are effective in feeding the material into the packaging funnel in a steady, non-clogging stream.

A further object of the invention is to provide a machine of the class described wherein the discharge funnel thereof is positioned in a manner to direct the weighed portion of material passing therethrough into a package or bag of suitable size.

A further object of the invention is to provide a machine of the class described which is strong and durable, which is compact, which operates substantially automatically, and which is otherwise well adapted for the purposes described.

With these and other objects in view, the invention consists of the improved weighing and packaging machine, and all of its parts and combinations, as set forth in the claims, and all equivalents thereof.

In the drawing accompanying and forming a part of this specification, wherein is shown one complete embodiment of the preferred form of the invention, and wherein the same reference numerals indicate the same parts in all of the views:

Fig. 1 is a side view of the improved weighing and packaging machine;

Fig. 2 is a fragmentary plan view of the invention partly in section, taken along the line 2—2 of Fig. 1;

Fig. 3 is a transverse vertical sectional view taken along the line 3—3 of Fig. 1;

Fig. 4 is a fragmentary plan view of the invention taken along the line 4—4 of Fig. 1;

Fig. 5 is a fragmentary view, on an enlarged scale, of a pair of the sizing rolls embodied in the invention;

Fig. 6 is a fragmentary side view on an enlarged scale of the hopper rollers embodied in the invention;

Fig. 7 is a transverse sectional view taken along the line 7—7 of Fig. 6;

Fig. 8 is a view of a scale dial of a modified form of the invention wherein photoelectric switches are used rather than the mercury-magnetic switches shown in the preferred form;

Fig. 9 is an enlarged view, partly in section, of a normally open mercury magnetic switch, taken along the line 9—9 of Fig. 1;

Fig. 10 is an enlarged view, similar to that of Fig. 9, of a normally closed mercury magnetic switch, taken along the line 10—10 of Fig. 1.

Figure 11:
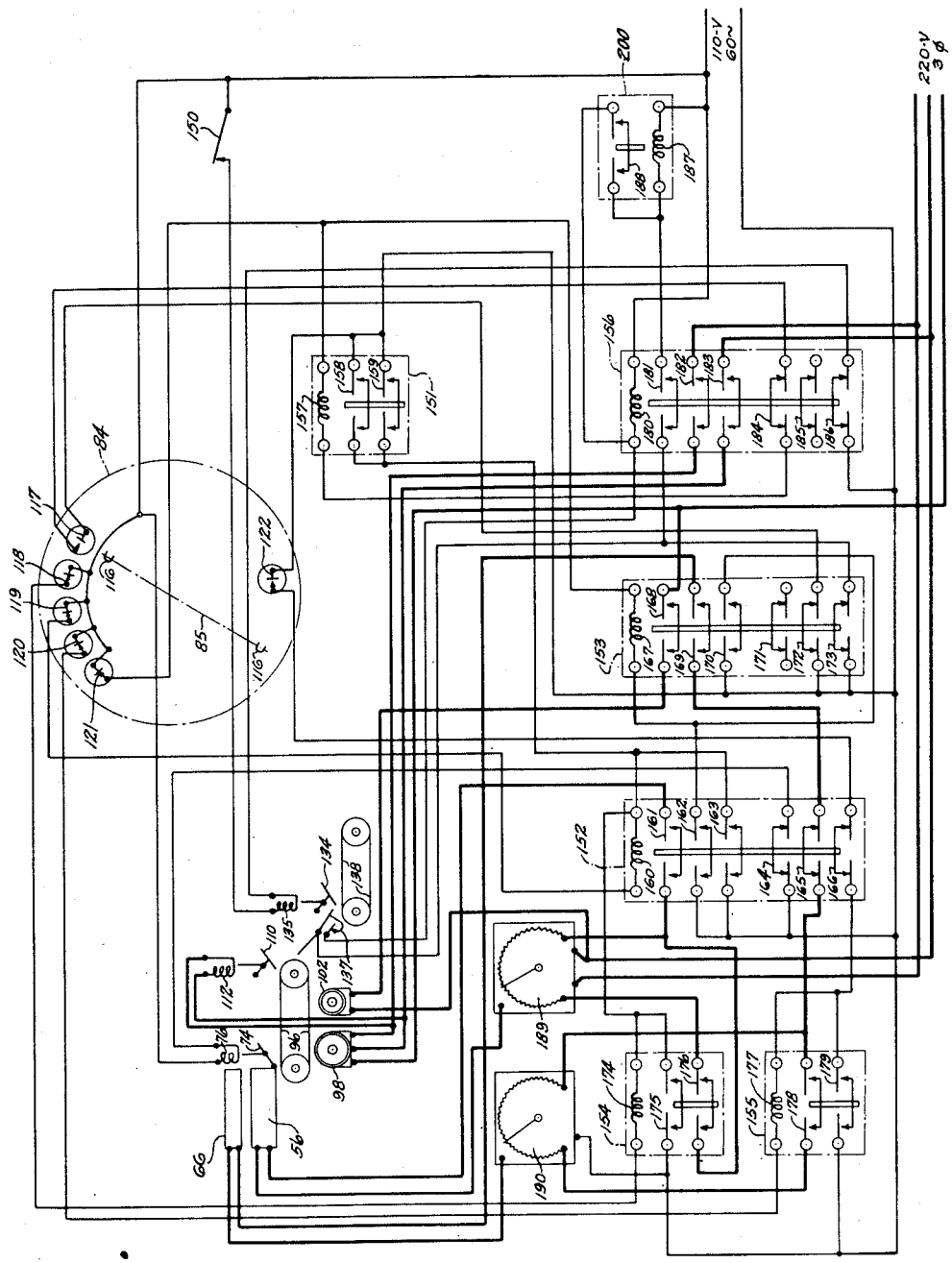
Fig. 11 is a diagrammatic view of the electric circuit.

Referring more particularly to the drawing, the numeral 10 indicates an improved dual hopper assembly, the numeral 11 indicates an improved weighing assembly cooperating with said hopper assembly, and the numeral 12 indicates an improved delivery assembly.

Dual hopper assembly

The dual hopper assembly 10 is comprised of a small hopper 13 and a large hopper 14; the upper portions of the hoppers 13 and 14 merge into a single substantially rectangular collar portion 15 having substantially vertical side walls. The hoppers 13 and 14 are provided with a common wall or partition 16 which extends from front to rear therebetween. The rear wall 17 of the hopper 13 tapers forwardly and downwardly from the collar 15 and the side wall 18 of the hopper 13 tapers downwardly and inwardly from the collar 15 to a bottom opening 19. The rear wall 20 of the hopper 14 tapers forwardly and downwardly from the collar 15 at a smaller angle from the vertical than does the wall 17 of the hopper 13, and the side wall 21 of the hopper 14 slopes downwardly and inwardly from the collar 15, to a bottom opening 54, as shown in Fig. 3. The front wall 37 of the collar 15 projects downwardly and also forms the front walls of the hoppers 13 and 14 as shown in Fig. 1.

Positioned on the collar 15 of the dual hopper assembly 10 directly above the small hopper 13 is a set of sizing rollers 22. The sizing rollers 22 are rotatably mounted substantially parallel with one another in equally spaced relationship.

Fig. 5 shows an enlarged fragmentary view of a pair of the preferred type of rollers 22. An electric motor 23 is preferably mounted on the side of the collar 15 as shown in Figs. 1, 3 and 4 and drives a pulley 24 by means of a suitable belt 25. The pulley 24 is mounted for rotation on the upper edge of the collar 15, and, in turn, drives a sprocket 26 through a shaft 27. Each of the rollers 22 is provided with suitable sprockets, as shown in Fig. 4, and by means of the chains 28 the rollers 22 all are made to rotate in the same direction and simultaneously. A chain 29 connects the sprocket 26 with the innermost roller 22, thereby permitting the transmisson of rotative power from the motor 23 through the belt 25, the pulley 24, the sprocket 26 and the chain 29 to the rollers 22. A suitable conveyor 30 is positioned with its delivery end adjacent the upper surface of the outer sizing roller 22, as shown in Figs. 3 and 4.

The hoppers 13 and 14 are formed with a suitable shoulder 31 in which the partition 16 is slidably positioned. The front and rear walls of the hoppers 13 and 14, as well as that of the collar 15, are preferably slotted to slidably receive the edge portions of the partition 16 as at 32 (see Fig. 3). The partition 16 is preferably provided with a suitable rack 33 which co-acts with a pinion 34 which is driven by a reversible motor 35. The partition 16 may be raised or lowered by operation of the motor 35 in one direction or the other.

The lower portion of the side wall 21 of the hopper 14 is provided with an extended portion 36 (see Figs. 1 and 4) which projects forwardly of the front wall 37. A similar member 38 projects forwardly of the wall 37 from a portion 41 (see Figs. 3 and 4) of the shoulder 31 which is positioned in the hopper 14. A plate member 39 projects from the lower portion of the wall 18 of the hopper 13 forwardly of the wall 37, and a similar plate member 40 extends forwardly of the wall 37 and is a projection of a portion 42 of the shoulder 31 which is in the hopper 13 (see Fig. 3). The wall 37 is formed with a suitable recess (not shown) in its lower margin between the plates 36 and 38 and between the plates 39 and 40.

The wall 21 and the extension 36 thereof are formed with an elongated recess 43 along the lower margin thereof. A roll 44 is rotatably mounted so that the axis thereof is parallel with the plane of the side 21 and so that a portion of the roll 44 extends inwardly of the inner surface of the wall 21 in the manner shown in Fig. 3. The roll 44 is preferably rubber covered and formed with rubber projections 45, as is clearly shown in the enlarged fragmentary views of Figs. 6 and 7. The roll 44 is provided with a suitable sprocket 46 at the rear end thereof and may be rotated in a counterclockwise direction as viewed in Fig. 3 by any suitable source of rotative power. A similar roller 47 is mounted in the portion 41 of the shoulder 31 parallel with the roller 44 and in the same manner as the roller 44. The roller 47 is rotated from a suitable source in a clockwise direction, as viewed in Fig. 3.

The wall 18 of the hopper 13 and the extension 39 thereof are formed with a recess 48 along the bottom margin thereof, and a rubber covered roller 49 is rotatably mounted on the wall 18 in a manner so that a portion thereof extends inwardly of the inner surface of the wall 18 in the manner shown in Fig. 3. Due to the angularity of the rear wall 17 of the hopper 13, the bottom edge of the wall 18 is shorter than the bottom edge of the wall 21. Therefore, the roller 49 is shorter than the roller 44. This is apparent from Figs. 1 and 2. A roller 50 is rotatably mounted in a recess 51 of the portion 42 parallel with the roller 49. The roller 50 may be rotated in a counterclockwise direction, and the roller 49 may be rotated in a clockwise direction from any suitable source of rotative power. The wall 18 is formed with a slot 52 which is parallel with the recess 48, and a roller 53 is rotatably mounted in the slot 52 parallel with the roller 49. The roller 53 is driven from the same source and rotates in the same direction as the roller 49. The rollers 49, 50 and 53 are of the same type as the rollers 44 and 47.

Positioned below the open bottom 54 of the hopper 14, but not directly connected thereto, is a conveyor 55 which is preferably of the vibratory type. The vibratory conveyor 55 consists of a vibrating mechanism 56 and a tray 57. The tray 57 has an elongated bottom plate 58 which is inclined slightly downwardly and forwardly. The tray 57 also has a rear wall 59 and side walls 60 and 61. The rear wall 59, and the side walls 60 and 61 are preferably flanged outwardly along their upper margins as shown in Fig. 3. The vibrating mechanism 56 is fixed to the underside of the tray 57, as shown in Fig. 1, and is suitably mounted as on springs 62 and 63. The vibrating mechanism 56 is preferably electrically operated.

Suitably mounted under the hopper 13 in a manner to register with the bottom opening 19 thereof, is preferably a vibratory conveyor 64, which consists of a tray 65 and a vibrating mechanism 66. The tray 65 is similar to the tray 57 though it is smaller and shorter. The tray 65 has a rear wall 67 and side walls 68 and 69, as well as an elongated bottom plate 70. It is preferably not directly connected to the hopper 13. The vibrating mechanism 66 is also preferably electrically operated and is correspondingly smaller than the vibratory mechanism 56. The mechanism 66 is suitably mounted on the springs 71 and 72, and is fixed to the under side of the tray 65.

The vibrating mechanisms 56 and 66 are preferably adjustable as to the intensity of the vibration created thereby, and for the purposes for which they are used in the invention, they are preferably operable at a high speed (intensity) or at a low speed (intensity).

Referring to Figs. 1 and 2, the open forward end 73 of the tray 57 is provided with a shut-off gate 74 which is pivotally mounted as at 75 for swinging movement along a horizontal axis. The shut-off gate 74 is preferably actuated by a solenoid 76 through a rod 77 which is pivotally connected to said gate. The solid lines of Fig. 1 show the shut-off gate 74 in closed position, and the dot and dash lines indicate the open position thereof.

If it is found desirable, the forward end 78 of the tray 65 may be provided with a shut-off gate which would open when the vibrator 66 is in operation and which would otherwise be closed. It will be noted that the forward end 78 of the tray 65 is positioned at substantially the same height and extends in substantially the same vertical plane as the outer end of the gate 74 when said gate is opened.

The electrical vibrating unit 56, and the source of rotative power for the rollers 44 and 47 are preferably so connected that they operate simultaneously. Similarly, the electric vibrating mechanism 66 and the source of rotative power for the rollers 49, 50 and 53 are preferably so connected that they operate simultaneously.

Weighing assembly

The weighing assembly 11 is comprised of a scale 82, having a weighing platform 83 and a dial 84 with an indicator arm 85. Referring to Fig. 2, extending upwardly from one side of the platform 83 near each end thereof, is a pair of angled support members 86 and 87. Extending upwardly from the other side of the platform 83 near each end thereof, is a pair of angled support members 88 and 89. Supported at the upper ends of the members 86 and 87 is a horizontal elongated frame member 90, and supported at the upper ends of the members 88 and 89 is an elongated horizontal frame member 91. The members 90 and 91 are preferably substantially parallel.

Rotatably mounted at the forward ends of the members 90 and 91 is a roller 92 having a shaft 93. Rotatably mounted at the rear ends of the members 90 and 91 is a roller 94 having a shaft 95. An endless weighing belt 96 extends around the rollers 92 and 94, as shown in Fig. 1. The ends of the members 90 and 91 supporting the shaft 95 and the roller 94 are preferably provided with a take-up mechanism 97 whereby the shaft 95 may be moved horizontally for the purpose of keeping the belt 96 under the proper tension.

It will be noted that the upper extent of the belt 96 is so positioned with respect to the forward end 78 of the tray 65 and the outer end of the gate 74, when said gate is opened, that said ends come very close to the belt 96 without actually touching it. A relatively high speed motor 98 is mounted on the scale platform 83 and is provided with a sprocket 99 which preferably has incorporated therein a uni-directional or "free wheeling" clutch. The shaft 95 extends beyond the take-up mechanism 97 at one end, and has fixed thereon a sprocket 100. A chain 101 connects the sprockets 99 and 100.

A relatively slow speed motor 102, preferably having incorporated therein a suitable gear reduction unit, is mounted on the scale platform 83, and is provided with a sprocket 103 which preferably has incorporated therein a uni-directional clutch similar to the clutch in the sprocket 99. A sprocket 104 is fixed to an outer end of the shaft 93 and is connected with the sprocket 103 by a chain 105. By reason of the clutches incorporated in the sprockets 99 and 103, the belt 96 may be driven either by the motor 98, through the roller 94, or by the motor 102, through the roller 92, and one motor may be operating without imparting any rotation to the other motor.

While the two electric motors 98 and 102 are used in the preferred form of the invention, a single motor having a high speed and a low speed may be used to drive the belt 96 in place of the two motors shown.

A pair of supporting brackets 106 extends upwardly from the outer surface of the member 90 near the supporting members 86 and 87 and extends inwardly over one side edge of the upper extent of the belt 96 and connects to a sideboard 107. The latter extends longitudinally of the belt 96, above said belt, and substantially parallel with the side edge thereof, as shown in Figs. 1 and 2. A pair of similar supporting brackets 108 projects upwardly from the member 91 and supports a sideboard 109 which corresponds with the sideboard 107 and is similarly mounted. The sideboards 107 and 109 extend rearwardly sufficiently so that the forward end 78 of the tray 65 and the forward end of the gate 74 when in open position extend between said side boards.

A weighing belt shut-off gate 110 is mounted at the forward ends of the side boards 107 and 109 for pivotal movement along a horizontal axis as shown in Fig. 1. The side boards 107 and 109 extend forwardly a sufficient distance so that the gate 110 is positioned substantially over the roller 92. A U-shaped bracket 111 extends upwardly from the sideboards 107 and 109, and a solenoid 112 is suitably mounted on a plate 113 fixed to the transverse extent of the bracket 111 substantially centrally thereof. A U-shaped yoke 114 is pivotally connected to each side of the gate 110 and a rod 115, which is adapted to be actuated by the solenoid 112, is connected to the yoke 114, as shown in Fig. 1.

The full lines of Fig. 1 show the shut-off gate 110 in closed position, and the dot and dash lines of Fig. 1 indicate the open position thereof.

Attached to each end of the indicator arm 85 of the scale 82 is preferably a small horseshoe magnet 116 having the arms thereof extending inwardly toward the dial 84. Mounted on the dial 84 of the scale 82 in positions wherein they are adapted to co-act with the horseshoe magnets 116 are preferably mercury magnetic switches 117, 118, 119, 120, 121 and 122. The switch 117 is positioned to register with the arm 85 when there is no material on the upper extent of the weighing belt 96. The switch 121 is positioned to register with the arm 85 when a predetermined weight of material is positioned on the weighing belt 96. The switches 118, 119 and 120 are suitably arranged between the switches 117 and 121 in a manner to co-act with the magnet 116 on the upper portion of the arm 85 as said arm travels between the switches 117 and 121. The switch 122 is preferably positioned so that the magnet 116 on the lower end of the arm 85 will coact therewith when the upper end of the arm 85 registers with the switch 119. The switches 117 and 122 are of the normally open type and the switches 118, 119, 120 and 121 are of the normally closed type.

Referring to Fig. 9, wherein is disclosed a normally open mercury magnetic switch of the type used for switch 117, the switch comprises a sealed glass body 123 having in the bottom thereof a drop of mercury 124. An electrical conductor 125 extends through the body 123 and into the mercury 124. Projecting through the upper end of the tube 123 is an electrical conductor 126 to which is connected a hair spring 127. Connected to an extended portion of the hair spring 127 is an arcuate rectangular plate 128 of very thin gauge. An L-shaped electrical connector 129 projects horizontally and downwardly from the plate 128, as shown in Fig. 9. The normal position of the movable parts of the switch 117 is shown by the dot and dash lines thereof. When, however, the arm 85 positions the horseshoe magnet 116 immediately adjacent the switch 117, said magnet attracts the plate 128 and pulls said plate toward it against the tension of the spring 127 in the manner shown in the full lines of Fig. 9. When the plate is pulled toward the magnet 116, the electrical contactor 129 which is normally out of engagement with the mercury 124, as shown in the dotted lines, is pulled by the plate 128 into contact with the mercury 124, thereby making a continuous connection between the wires 125 and 126.

Referring to Fig. 10, the operation of a normally closed mercury magnetic switch, such as the switch 120, is similar to that of a normally open switch. The difference in construction between the switches 117 and 120 is in the shape of the electrode which is numbered 129 in the switch 117. The electrode 130 in the switch 120, when the movable portion of the switch 120 is in its normal full line position, is in contact with the mercury 131 of the switch 120. When the magnet 116 is brought into position adjacent the switch 120 by the arm 85, the movable portion of the switch 120 is swung to the dot and dash line position shown in Fig. 10. It will be noted that in this position the electrode 130 is out of contact with the mercury 131 and, therefore the circuit through the switch 120, which was formerly closed in the normal position, is now broken.

Delivery assembly

Referring to Figs. 1 and 2, an intermediate hopper 132 is positioned with its open upper end in front of and substantially on the same level with the upper extent of the weighing belt 96. The hopper 132, however, is so mounted that there is no direct connection between it and any part of the weighing assembly 11. The hopper 132 is formed as shown in Figs. 1 and 2 with sloping side and rear walls, and has an open bottom 133 which is provided with a swingable shut-off gate 134. The solid lines of Fig. 1 show the closed position of the gate 134, and the dot and dash lines show the open position of said gate. A solenoid 135 is operatively connected with the shutoff gate 134 in a manner to permit said solenoid to open said gate when said solenoid is actuated. The rear wall of the hopper 132 is provided at its lower end with a hinged portion 136 which is adapted to coact with a normally closed electrical switch 137. Whenever there is any material in the hopper 132, the hinged wall portion 136 will press against the switch 137 to break the electrical contact therein.

An endless delivery conveyor belt 138 is preferably positioned with one end below the open end 133 of the intermediate hopper 132. The belt 138 is mounted on spaced rollers 139 and 140 which in turn are journalled on a suitable frame 141. The roller 140 is preferably driven by a motor 142 through suitable worm gearing in a housing 143. Mounted on suitable brackets which extend upwardly from the frame 141 are a pair of skirts or side boards 144 and 145. The skirts 144 and 145 are positioned above the upper extent of the belt 138 with their rear ends on each side of the lower end of the hopper 132, as is clearly shown in Fig. 2. The skirts 144 and 145 extend forwardly and converge inwardly, as shown in Fig. 2, forming a relatively narrow throat at their forward ends. The forward ends of the skirts 144 and 145 terminate even with the forward end of the belt 138. It will also be noted that the skirts 144 and 145 are wider at their rear ends than they are at their forward ends, and that at their rear ends said skirts project angularly outwardly and upwardly, while at their forward ends said skirts extend in substantially vertical planes.

Mounted on the forward end of the frame 141, in a manner to receive material discharged from the belt 138, through the throat formed by the skirts 144 and 145, is a packaging funnel 146, having a substantially rectangular upper portion 147. The lower end of the funnel 146 is provided with a substantially conical section 148, the lower end of which is open, as at 149. The funnel 146 shown is adapted for use in directing material into bags in the manner shown in dot and dash lines of Fig. 1; however, the shape of the funnel 146 may be varied as required to adapt the same to the filling of boxes or the like. A manually controlled normally open single pole single throw electrical switch 150 is preferably mounted on the forward end of the frame 141, as shown in Figs. 1 and 2.

Operation

The material to be weighed and packaged is composed of units of various sizes and shapes, such as potatoes, for example. Referring to Figs. 1 and 3, the material is discharged from a suitable source onto the conveyor 30, which, in turn, discharges the material onto the sizing rollers 22 which are rotating in a counterclockwise direction, as viewed in Fig. 3. The larger units of the material will roll along the tops of the rollers 22 and will drop into the large hopper 14. The smaller units of the material will drop through the spaces between the rollers 22 and will drop into the hopper 13. If for any reason there is an excess of the smaller units, the partition 16 may be lowered, by operation of the motor 35, so that the excess of the smaller units will overflow into the hopper 14.

At the beginning of a weighing operation there is no material on the weighing belt 96, and the scale arm 85 is disposed as shown in Fig. 1, wherein the upper end thereof bearing the magnet 116 is adjacent the mercury magnetic switch 117. Also, at the beginning of a weighing operation the shut-off gate 74 at the forward end of the tray 65 is opened to the dot and dash line position shown in Fig. 1, the rollers 44 and 47 being oppositely rotated in the direction shown in Fig. 3, and the vibrating mechanism 56 being operated at high speed or intensity. Large units of material are thereby caused to pass from the hopper 14, along the tray 65, and are discharged from the forward end 73 of the tray 57, over the open gate 74. The units of material roll onto the upper extent of the weighing belt 96, which is being moved slowly in a forward direction by the slow speed motor 103. Since the material which is being weighed is of the non-free flowing type, such as, for example, potatoes or onions, it has a tendency to arch or jam in the hoppers rather than to flow freely out along the tray 57. The rollers 44 and 47 engage the material in the hopper 14 and keep the material with which they are in contact moving upwardly in a manner to break down any arching or jamming which might otherwise occur in the hopper 14, as the material moves downwardly in said hopper toward the tray 57. The rollers also rotate elongated units of the material so that they are lengthwise of the tray 57 as they pass downwardly through the hopper 14 and along said tray, thereby preventing jamming by the elongated units.

As material is deposited onto the belt 96, adjacent the outer end of the open gate 74, this material is carried slowly forward by the belt and is prevented from being discharged therefrom by the shut-off gate 110. By having the weighing belt 96 moving slowly in a manner to move the units of material deposited thereon forwardly and away from the mouth of the vibratory conveyor 55, error which would otherwise result from the piling up of the material at the mouth of said conveyor is eliminated. As the weight of material on the belt 96 increases, the arm 85 moves the magnet 116 on its upper end adjacent the mercury magnetic switch 118. This causes the vibrating mechanism 56 to operate at a lower speed or intensity, and thereby slows down the speed with which the large units of material are deposited on the belt 96 from the tray 65.

An increase in the weight of the material deposited on the belt 96 causes the arm 85 of the scale to move the magnet 116 on the upper end thereof to a position adjacent the mercury magnetic switch 119, and to move the magnet 116 on the lower end thereof adjacent the mercury magnetic switch 122. This causes the vibrating mechanism 56 to stop, causes the rollers 44 and 47 to stop, and closes the gate 74. Simultaneously, the vibrating mechanism 66 begins operating at high speed or intensity, and the rollers 49, 50 and 53 in the hopper 13 are started rotating in the directions indicated in Fig. 3. This causes the smaller units of material in the hopper 13 to move down through said hopper, along the tray 65 and onto the weighing belt 96 at a relatively high rate of speed. The rollers 49 and 50 in the hopper 13 perform the same function in the hopper 13 as the rollers 44 and 47 do in the hopper 14. The additional roller 53 in the smaller hopper, rotating in the same direction as the roller 49, has been found to give favorable results in the narrower hopper. The roller 53 performs substantially the same work as the roller 49.

As the weight of material on the weighing belt 96 increases, the arm 85 of the scale 11 rotates further in a counterclockwise direction and moves the magnets 116 away from the switches 119 and 122, and brings the upper magnet 116 adjacent the switch 120. This causes the vibrator mechanism 66 to operate at low speed or intensity, and as a result, the smaller units are discharged from the tray 65 onto the belt 96 at a slow or dribbling rate, substantially one unit at a time.

When the weight of material on the weighing belt 96 reaches a predetermined amount, the upper magnet 116 on the arm 85 is adjacent the switch 121. This causes the vibrating mechanism 66 to stop and likewise causes the rollers 49, 50 and 53 to stop. At this point the slow speed weighing belt motor 102 stops. If there is no material in the intermediate hopper 132, the high speed weighing belt motor 98 will then drive the weighing belt 96 at a high speed, and the solenoid 112 will simultaneously open the weighing belt shut-off gate 110, to permit the accurately weighed portion on the belt 96 to be rapidly discharged into the intermediate hopper 132.

It will be noted that both the high speed weighing belt motor 98 and the slow speed weighing belt motor are mounted on the scale platform 83. This construction assures that no torque or pressure, other than that exerted by the weight of the material fed onto the weighing belt 96, is exerted on the scale platform during the weighing operation.

It will also be noted that the gate 74 of the large vibratory conveyor 55, when in open position, and the end 78 of the small vibratory conveyor 64 both terminate very close to the upper extent of the weighing belt 96. This not only prevents errors in accuracy which would be caused by the momentum of the units if dropped onto the belt from a higher position, but it also promotes accuracy by making the weight of the material register immediately after it leaves the vibratory conveyors. By doing this, error caused by units in suspension is eliminated, for example, where a higher discharge point is used and a unit just leaves the mouth of a vibratory conveyor as the predetermined weight of material on the belt 96 is reached, the weighed portion will be overweight by an amount equal to the weight of the unit which was dropping from the conveyor onto the belt 96 at the instant the predetermined weight was reached by the portion already on the belt.

By eliminating errors from the momentum of dropping units and from units in suspension, and also by bringing the portion on the belt 96 up to the predetermined weight by feeding small units thereto at slow speed during the last stage of the weighing operation, the accuracy of the improved weighing machine can be kept within very fine limits. With the improved machine the overweight error can be kept to a maximum equal to the weight of one small unit. This accuracy is very important, since the machine is adapted for use in weighing out large quantities of bulk materials into small packages, such as, for example, packages containing ten or fifteen pounds. While an overweight error of ounces may seem to be inconsequential with respect to a single package, when this error is multiplied by thousands per day it becomes a matter of importance. By reducing the overweight error to an absolute minimum, substantial savings are effected by the invention.

The operation of the gate 134 is controlled by the packaging operator by means of the manually controlled switch 150 at the forward end of the delivery assembly 12. The electrical circuit is provided with interlocking means (in a manner which will be apparent from the electrical diagram of Fig. 11 and the description thereof contained hereinafter) which prevents the gate 134 from being opened while the gate 110 is opened, and it also prevents the gate 110 from opening while the gate 134 is opened. The interlocking switch 137 actuates an adjustable electric time control (shown only as relay 157 in Fig. 11) for regulating the open period of the gate 110 and also the operating period of the high speed weighing belt motor 98. The interlocking switch 137 also prevents the gate 110 from opening and the motor 98 from operating when there is any material in the hopper 132. These interlocks prevent intermingling of separate accurately weighed portions of material and the errors which would result therefrom.

When the gate 134 is opened, the material in the hopper 132 passes down through the open lower end 133 thereof and is discharged onto the continually moving relatively high speed delivery conveyor belt 138. The belt 138 carries the material forwardly toward the packaging funnel 146. The sideboards or skirts 144 and 145 along the upper extent of the belt 138 are positioned, as previously described, so that they converge toward the funnel 146. This disposition of the skirts 144 and 145 alines elongated units of material in the direction of travel of the belt 138 and results in the material being fed into the funnel 146 in a steady, non-clogging stream. A suitable bag or package (shown in dot and dash lines in Fig. 1) is placed below the funnel 146 in such a manner that the funnel will direct the material therein.

Referring to Fig. 11, the electrical circuit by means of which the operation of the improved machine is controlled contains certain relays and resistance units not heretofore mentioned or described. A resistance unit 189 is associated with the large vibrating unit 56 and the resistance unit 190 is associated with the small vibrating unit 66, as shown. The double pole single throw relay 151 is provided with a solenoid coil 157 and with a pair of normally open sets of contacts 158 and 159. The double pole single throw relays 154 and 155 are provided respectively with solenoid coils 174 and 177 and are also provided respectively with pairs of sets of contacts 175 and 176, and 178 and 179.

The relays 152, 153 and 156 are six pole, single throw relays and are provided respectively with solenoid coils 160, 167, and 180. The relay 152 is provided with the normally open sets of contacts 161, 162, and 163, and with the normally closed sets of contacts 164, 165 and 166. The relay 153 has the normally open contacts 168, 169 and 170 and the normally closed contacts 171, 172 and 173. The relay 156 has the normally open contacts 181, 182 and 183, and the normally closed contacts 184, 185 and 186. The relay 200 is a delayed action type of relay having a solenoid 187 and a single set of normally open contacts 188. The construction of the relay 200 is preferably such that upon energization of the solenoid 187 the contacts 188 will close and remain closed for a predetermined interval of time, after which they will open.

The operation of the improved machine will now be described with reference to the electrical diagram of Fig. 11. The heavy lines in Fig. 11 indicate a 220 volt power circuit, and the light lines indicate a 110 volt 60 cycle control circuit. As a starting point it will be assumed that there is material in the intermediate hopper 132 which is holding the switch 137 open. It will also be assumed that there is no material on the weighing belt 96, and that therefore the arm 85 of the scale is adjacent the switch 117.

When the switch 150 is open and the switch 117 is closed by the magnet 116, the solenoid 157 of relay 151 is energized, thereby closing contacts 158 and 159. This causes energization of the solenoid 160 of the relay 152 thereby closing the contacts 161, 162, and 163, and at the same time opening the contacts 164, 165 and 166. Closing the contacts 158 and 159 also energizes the coil 174 of the relay 154 and closes the contacts 175 and 176 thereof.

Opening of the contacts 164 causes deenergization of the solenoid 76 and allows the gate 74 of the large vibratory conveyor 55 to drop to open position. Closing of the contacts 161 and 176 causes the large vibrator 56 to operate at high speed or intensity. Closing the contacts 162 causes the coil 167 of the relay 153 to be energized, thereby closing contacts 168, 169 and 170 and opening contacts 171, 172 and 173. Opening of the contacts 172 will deenergize the coil 157 of relay 151 and will open the contacts 158 and 159, but the coils 154 and 160 of the relays 154 and 152 remain energized through the contact 175 of relay 154. Closing of the contacts 168 of relay 153 causes the slow speed weighing belt motor 102 to operate and to drive the weighing belt 96 at slow speed.

The large vibratory conveyor 55 is now discharging material onto the belt 91 and the arm 85 is moving counterclockwise, opening the contacts at switch 117 with no result. The arm 85 opens the contacts at the switch 118 as it moves the magnet 116 thereadjacent, thereby deenergizing the coil 174 of the relay 154 and opening the contacts 175 and 176. Opening the contacts 176 causes the large vibratory conveyor 55 to run at low speed and to continue to deliver material to the weighing belt 96 but at a slower speed. This causes the arm 85 to move the magnet 116 from the switch 118 to the switch 119. The switch 118 is thereby closed and the switch 119 opened. At the same time the magnet 116 on the lower end of the arm 85 closes the switch 122.

Opening of the switch 119 causes deenergization of the coil 160 of the relay 152, thereby opening the contacts 161, 162 and 163, and closing the contacts 164, 165 and 166. Opening the contacts 161 stops the large vibrator 56. Closing the contacts 164 of the relay 152 causes energization of the solenoid 76 which immediately closes the gate 74 of the large vibratory conveyor 55. Closing the contacts 166 causes energization of the coil 177 of the relay 155, thereby closing the contacts 178 and 179 thereof. Closing the contacts 165 causes the small vibrator 66 to operate at high speed or intensity. The small vibratory conveyor 64 is now discharging material onto the weighing belt 96 and causes the arm 85 to move the magnets 116 away from the switches 119 and 122, causing the former to close and the latter to open.

The magnet 116 on the upper end of the arm 85 then moves adjacent the switch 120 to open the contacts thereof. This deenergizes the coil 177 of the relay 155 and opens the contacts 178 and 179 thereof to cause the small vibrator 66 to operate at low speed or intensity. The small vibrator continues to discharge units of material onto the weighing belt 96 at a slow rate thereby moving the magnet 116 on the upper end of the arm 85 from adjacent the switch 120 to adjacent the switch 121 as the predetermined weight of material on the weighing belt is reached. This closes the switch 120 and opens the switch 121.

Opening of the switch 121 causes deenergization of the coil 167 of the relay 153, thereby opening the contacts 168, 169 and 170 and opening the contacts 171, 172 and 173. Opening the contacts 168 causes the slow speed weighing belt motor 102 to stop, and opening of the contacts 169 causes the small vibrator 66 to stop. There is now an accurately weighed portion of material deposited on the weighing belt 96 and said belt is stopped. There is also a similar portion of material in the intermediate conveyor 132 which keeps the switch 137 open.

Upon closing the manually operated switch 150 the solenoid 135 is energized and it opens the gate 134 of the intermediate hopper 132. This permits the material in the hopper 132 to be deposited onto the relatively high speed delivery conveyor belt 138. When the intermediate hopper 132 becomes empty the contacts of the switch 137 close, thereby energizing the coil 180 of the relay 156 and causing the contacts 181, 182 and 183 to close as the contacts 184, 185 and 186 are opened.

Breaking the contacts 186 causes deenergization of the coil 135 and closing of the gate 134. Closing of the contacts 181 causes energization of the coil 187 of the relay 200. Closing of the contacts 182 and 183 causes operation of the high speed weighing belt motor 98 and simultaneous energization of the solenoid 112 which, in turn, opens the gate 110 at the forward end of the weighing belt 96.

The material on the belt 96 is now rapidly discharged into the intermediate hopper which has just been emptied, and the weight of this material again opens the switch 137. As the material in the weighing belt 96 is discharged, the scale arm 85 moves clockwise away from the switch 121 and toward the switch 117. The magnet 116 on the upper end of the arm 85 thereby closes the switch 121 and closes the switch 117.

After a predetermined time interval, the contacts 189 of the relay 200 (an adjustable time controlled relay) separate and break the circuit therebetween. Opening of the contacts 188 causes deenergization of the coil 130 of the relay 156, thereby opening the contacts 131, 132 and 133 and closing contacts 134, 185 and 186 thereof.

Opening of the contacts 182 and 183 breaks the circuit to the high speed weighing belt motor 98 and to the solenoid 112. This stops the motor 98, as well as the weighing belt 96, and causes the deenergization of the solenoid 112 with the resultant closing of the gate 110 at the forward end of the belt 96. Closing of the contacts 184 causes energization of the coil 157 of the relay 151, thereby closing the contacts 158 and 159. Closing of the contacts 186 makes it possible for the circuit to the solenoid 135 to be closed by the manually operated switch 159.

One weighing operation has now been completed. The machine will now automatically weigh out on the weighing belt 96 a predetermined amount of material, and it will then stop until the material in the intermediate hopper 132 has been discharged onto the delivery belt 133. As described hereinbefore, emptying of the intermediate hopper 132 will permit the discharge of a weighed portion of material from the weighing belt 96 into said hopper and will permit a new portion of material to be deposited on the weighing belt 96. The improved machine will operate continuously, as long as the manually operated switch 159 is actuated, as soon as a newly weighed portion of material is deposited in the intermediate hopper 132.

A modified form of the invention is shown in Fig. 8, wherein a preferably concave mirror 191 is fixed to that shaft, in the preferred form of the invention, which carries the arm 85 of the scale 82. Photoelectric switches 192, 193, 194, 195 and 196 are positioned about the periphery of the scale dial 84 at the same angular positions with respect to the center thereof as the mercury-magnetic switches 117, 118, 119, 120 and 121 are placed in the preferred form. A source of light 197 directs a beam at the mirror 191, and the beam is reflected to one of the photoelectric switches which are either normally open or normally closed, corresponding to the switches 117 to 121. The dot and dash line of Fig. 8 shows the beam reflected to the switch 192.

The use of the modified form of the invention eliminates any error which might otherwise be caused by the momentum or inertia of the scale arm 85, or by the magnetic attraction of the magnets 116 for the switches 117 to 121.

It is apparent from the foregoing description that the improved weighing and packaging machine is not only fast in operation and very accurate, but also that it is substantially automatic and continuous. For a machine of this type it is very compact and contains a minimum number of parts.

Various changes and modifications may be made without departing from the spirit of the invention, and all of such changes are contemplated as will come within the scope of the claims.

What we claim is:

1. Mechanism for measuring out an accurately weighed portion of non-free-flowing material, comprising a scale having a weighing platform, an endless belt conveyor having a feed end and having a discharge end mounted on said platform, a normally closed shut-off gate mounted on said platform at the discharge end of said belt conveyor for movement therewith in response to weight changes and in a position to normally prevent discharge of material therefrom, a second conveyor for discharging material onto the feed end of said endless belt conveyor, the discharge end of said second conveyor being positioned sufficiently close to said endless belt that there is no substantial dropping of the material from said end onto said belt, and means mounted on said weighing platform for driving said belt to move the material thereon toward said shut-off gate while said material is being weighed.

2. Mechanism for measuring out an accurately weighed portion of non-free-flowing material, comprising a scale having a weighing platform, an endless belt conveyor having a feed end and having a discharge end mounted on said platform, a shut-off gate mounted on said platform for movement therewith in response to weight changes at the discharge end of said conveyor belt in a position to control the flow of material off of said belt, means for discharging material onto the feed end of said endless belt conveyor, said means being positioned sufficiently close to said endless belt that there is no substantial dropping of the material onto said belt, variable speed means for driving said belt first at relatively slow speed to move the material thereon toward said shut-off gate while said material is being weighed, means connected to said scale and to said gate and responsive to the deposit of a predetermined weight of material onto said belt for opening said shut-off gate, and means for causing said belt driving means to drive said belt at relatively high speed when said shut-off gate is opened to discharge the weighed portion of material from said belt.

3. Mechanism for measuring out an accurately weighed portion of bulk material from a mass composed of individual pieces comprising: a scale having a weighing platform; an endless conveyor mounted on said platform and having a feed end and a discharge end; a first normally closed shut-off gate supported on said platform for movement therewith in response to weight changes and positioned at the discharge end of said endless conveyor in a manner to control the flow of material off of said endless conveyor; means for feeding material onto the feed end of said endless conveyor, said feeding means including a second normally open shut-off gate swingable on a horizontal axis between a closed raised position where it prevents feed onto said endless conveyor and an open lowered generally horizontal position where it forms a chute for said feeding means, said gate normally having its free end positioned sufficiently close to said endless conveyor that there is no substantial dropping of the material from said gate during feeding of material; variable speed means mounted on said scale platform and connected to said conveyor and to said first shut-off gate to drive said conveyor at relatively slow speed when said first shut-off gate is closed and at relatively high speed when said first gate is open; and means connected to said scale and to said shut-off gates and responsive to the attainment of a predetermined weight of material on said conveyor for opening said first shut-off gate and closing said second shut-off gate.

4. Mechanism for measuring out an accurately weighed portion of bulk material from a mass composed of individual pieces, comprising: a scale having a weighing platform, an endless belt conveyor mounted on said platform and having a feed end and a discharge end; a shut-off gate positioned at the discharge end of said conveyor belt to control the flow of material off of said belt; a second conveyor for feeding material onto the feed end of said endless belt conveyor, the discharge end of said second conveyor being positioned sufficiently close to said endless belt that there is no substantial dropping of the material from said discharge end onto said belt during feeding of said material; a motor mounted on said scale platform and connected to said belt and to said shut-off gate to drive said belt at relatively slow speed while said gate is closed; a second motor mounted on said scale platform and connected to said belt and to said shut-off gate to drive said belt at relatively high speed to discharge the weighed portion of material from said belt when said shut-off gate is opened; and means including an electrical circuit connected to said scale, gate, second conveyor, and motors, and responsive to the deposit of a predetermined weight of material on said belt to stop the operation of said second conveyor, open said gate, and cause high speed operation of said second motor and belt.

5. Mechanism for measuring out an accurately weighed portion of bulk material from a mass composed of individual pieces, comprising: a scale having a weighing platform and having a movably mounted member movable to a plurality of predetermined positions in response to corresponding predetermined weights on said platform; a first endless belt conveyor mounted on said platform and having a feed end and a discharge end; a feed conveyor for feeding material onto the feed end of said endless belt conveyor; a first normally open shut-off gate mounted on the discharge end of the feed conveyor to control the feed of material onto said belt; variable speed actuating means connected to each conveyor and normally driving said feed conveyor at a relatively high speed and said belt conveyor at a relatively low speed; a second normally closed shut-off gate mounted on said platform at the discharge end of said belt conveyor to control the discharge of material from the latter; a plurality of electric switches positioned to be actuated successively by movement of said movable member in response to predetermined increases in the weight of material on said first belt conveyor; and means including an electrical circuit connected to said switches, to said conveyor actuating mechanisms and to said shut-off gates in a manner to cause slow speed operation of said feed conveyor in response to the deposit of a predetermined weight of material onto said belt, said means being responsive to the deposit of a predetermined additional weight of material onto said belt to stop the feed conveyor and to open the shut-off gate as well as to cause relatively high speed operation of said belt.

6. Mechanism for measuring out accurately weighed portions of bulk material from a mass composed of individual pieces, comprising: a scale having a weighing platform; an endless belt conveyor mounted on said platform and having a feed end and a discharge end; a normally closed shut-off gate mounted on said platform at the discharge end of said conveyor belt and normally in a position to prevent the flow of material off of said belt; means on said platform for driving said conveyor belt; a feed conveyor positioned to feed material onto the feed end of said belt conveyor; actuating mechanism for said feed conveyor and for said shut-off gate; and means including an electrical circuit connected to said scale, to said feed conveyor actuating mechanism, and to said shut-off gate actuating mechanism in a manner to normally cause actuation of said feed conveyor, said means being responsive to the deposit of a predetermined weight of material on said belt to stop said feed conveyor and open said shut-off gate.

7. Mechanism for measuring out accurately weighed portions of bulk material from a mass composed of individual pieces, comprising: a scale having a weighing platform; an endless belt conveyor mounted on said platform and having a feed end and a discharge end; a first normally closed shut-off gate mounted on said platform at the discharge end of said conveyor belt and normally in a position to prevent the flow of material off of said belt; means on said platform for driving said conveyor belt; a feed conveyor positioned to discharge material onto the feed end of said belt conveyor; a second normally open shut-off gate mounted on the discharge end of said feed conveyor, said second gate being vertically swingable between a raised closed position where it prevents discharge of material onto said belt and a lowered open generally horizontal position where it forms a discharge chute, said gate normally having its discharge end positioned sufficiently close to the endless belt that there is no substantial dropping of the material onto said belt during feeding; actuating mechanism for said feed conveyor and for each of said shut-off gates; and means including electrical circuit connected to said scale, to said feed conveyor, and to said shut-off gates in a manner to normally cause actuation of said feed conveyor, said means being responsive to the deposit of a predetermined weight of material onto said belt to stop the operation of said feed conveyor and close said second gate as well as to open said first shut-off gate.

8. Mechanism for measuring out accurately weighed portions of bulk material from a mass composed of individual pieces, comprising: a scale having a weighing platform; an endless belt conveyor mounted on said platform and having a feed end and a discharge end; a normally closed shut-off gate mounted on said platform at the discharge end of said conveyor belt and normally in a position to prevent the flow of material off of said belt; means on said platform for driving said conveyor belt; a feed conveyor positioned to discharge material onto the feed end of said belt conveyor; a normally operating actuating mechanism for said feed conveyor; a discharge hopper positioned to receive a weighed portion of material discharged from said belt; a switch in said discharge hopper positioned to be actuated by material in said hopper; and means including an electrical circuit connected to said scale, to said feed conveyor actuating mechanism, to said shut-off gate, and to said hopper switch and responsive to the deposit of a predetermined weight of material on said belt to stop the operation of said feed conveyor actuating mechanism and to open said shut-off gate, said circuit including interlocking means for preventing opening of said shut-off gate whenever there is material in said hopper.

9. Mechanism for measuring out an accurately weighed portion of bulk material from a mass composed of individual pieces comprising a scale having a supporting portion movable in response to changes in weight, a shut-off gate mounted on said portion for movement therewith in response to weight changes, means for opening and closing said gate, and an endless conveyor also mounted on said supporting portion of the scale for movement therewith in response to weight changes and having a discharge end positioned to convey material into contact with said gate.

10. Mechanism for measuring out an accurately weighed portion of bulk material from a mass composed of individual pieces comprising a scale having a supporting portion movable in response to changes in weight, a shut-off gate mounted on said portion for movement therewith in response to weight changes, means for opening and closing said gate, and an endless conveyor also mounted on said supporting portion of the scale for movement therewith in response to weight changes and having a discharge end positioned to convey material into contact with said gate, means for moving said endless conveyor at relatively slow speed during a weighing operation and at relatively high speed after weighing.

LOUIS D. CARON, Jr.
WALTER J. HOENECKE.

REFERENCES CITED

The following references are of record in the file of this patent:

UNITED STATES PATENTS

| Number | Name | Date |
|---|---|---|
| 467,177 | Joubert | Jan. 18, 1892 |
| 560,600 | Richards | May 19, 1896 |
| 912,088 | Dempsey | Feb. 9, 1909 |
| 1,603,865 | Robbins | Oct. 19, 1926 |
| 1,617,301 | Reddick | Feb. 8, 1927 |
| 1,992,716 | Paxton | Feb. 26, 1935 |
| 2,071,443 | Weckerly | Feb. 23, 1937 |
| 2,159,851 | Hicks | May 23, 1939 |
| 2,174,348 | Damond | Sept. 26, 1939 |
| 2,197,514 | Barnes | Apr. 16, 1940 |
| 2,342,116 | Broekhuysen | Feb. 22, 1944 |
| 2,352,114 | Muskat | June 20, 1944 |
| 2,434,177 | Richardson | Jan. 6, 1948 |
| 2,523,179 | Alvord | Sept. 19, 1950 |